United States Patent
Marot et al.

(10) Patent No.: US 11,208,197 B2
(45) Date of Patent: Dec. 28, 2021

(54) GIMBALED FAN

(71) Applicant: Heka Aero LLC, Satellite Beach, FL (US)

(72) Inventors: Christopher Marot, Satellite Beach, FL (US); Ricardo Romeu, Satellite Beach, FL (US); Eric Holland, Satellite Beach, FL (US)

(73) Assignee: Heka Aero LLC, Satellite Beach, FL (US)

( * ) Notice: Subject to any disclaimer, the term of this patent is extended or adjusted under 35 U.S.C. 154(b) by 183 days.

(21) Appl. No.: 16/042,235

(22) Filed: Jul. 23, 2018

(65) Prior Publication Data
US 2018/0354607 A1 Dec. 13, 2018

Related U.S. Application Data

(63) Continuation-in-part of application No. 15/899,140, filed on Feb. 19, 2018, now Pat. No. 10,800,513.

(60) Provisional application No. 62/479,355, filed on Mar. 31, 2017.

(51) Int. Cl.
| B64C 11/06 | (2006.01) |
| F16M 11/18 | (2006.01) |
| F16M 11/12 | (2006.01) |
| B64C 29/00 | (2006.01) |
| B64C 11/32 | (2006.01) |
| B64C 39/10 | (2006.01) |
| B64C 11/00 | (2006.01) |
| B64C 39/02 | (2006.01) |

(52) U.S. Cl.
CPC ............ *B64C 11/06* (2013.01); *B64C 11/001* (2013.01); *B64C 11/32* (2013.01); *B64C 29/0033* (2013.01); *B64C 39/024* (2013.01); *B64C 39/10* (2013.01); *F16M 11/123* (2013.01); *F16M 11/18* (2013.01); *B64C 2201/028* (2013.01); *B64C 2201/042* (2013.01); *B64C 2201/088* (2013.01); *B64C 2201/108* (2013.01); *B64C 2201/162* (2013.01); *B64C 2201/165* (2013.01)

(58) Field of Classification Search
CPC ... B64C 11/06; B64C 11/001; B64C 29/0033; F16M 11/123; F16M 11/18
See application file for complete search history.

(56) References Cited

U.S. PATENT DOCUMENTS

| 4,037,807 A | 7/1977 | Johnston et al. |
| 4,648,345 A * | 3/1987 | Wham ................. B63H 3/06 114/338 |
| 6,883,750 B2 | 4/2005 | Gmirya |

(Continued)

*Primary Examiner* — Michael L Sehn
(74) *Attorney, Agent, or Firm* — Lowndes; Stephen C. Thomas; Kelly G. Swartz

(57) ABSTRACT

A fan for providing thrust including at least one blade, a hub adapted to carry the at least one blade, a hub motor adapted to rotate the hub 360 degrees about a first axis extending perpendicular to the at least one blade, a first mount adapted to carry the hub, and a first mount motor adapted to rotate the hub 360 degrees about a second axis perpendicular to the first axis and extending through the first mount first and second side securing points. The first mount may include a first mount first side securing point adapted to pivotally carry the hub, and a first mount second side securing point adapted to pivotally carry the hub.

19 Claims, 4 Drawing Sheets

(56) References Cited

U.S. PATENT DOCUMENTS

| | | | |
|---|---|---|---|
| 6,976,899 B1* | 12/2005 | Tamanas | A63G 29/02 |
| | | | 446/178 |
| 8,205,820 B2 | 6/2012 | Goossen et al. | |
| 8,348,190 B2 | 1/2013 | Fleming | |
| 8,387,911 B2 | 3/2013 | Collette | |
| 8,464,978 B2* | 6/2013 | Yim | B64C 27/20 |
| | | | 244/17.23 |
| 8,500,067 B2 | 8/2013 | Woodworth et al. | |
| 8,720,814 B2 | 5/2014 | Smith | |
| 9,067,676 B1* | 6/2015 | Hethcock | B64C 27/82 |
| 9,493,235 B2 | 11/2016 | Zhou et al. | |
| 9,527,596 B1 | 12/2016 | Adams | |
| 9,878,786 B2 | 1/2018 | Chan et al. | |
| 2006/0220281 A1 | 10/2006 | Walton | |
| 2011/0001017 A1 | 1/2011 | Burdisso | |
| 2012/0153087 A1 | 6/2012 | Collette et al. | |
| 2012/0234984 A1 | 9/2012 | Entsminger et al. | |
| 2017/0001721 A1 | 1/2017 | Saika et al. | |
| 2017/0144771 A1 | 5/2017 | Lukaczyk et al. | |
| 2017/0175948 A1 | 6/2017 | Zeise et al. | |
| 2017/0254473 A1* | 9/2017 | Katz | F16M 11/123 |
| 2017/0349281 A1 | 12/2017 | Quinlan et al. | |

* cited by examiner

GIMBALED FAN

RELATED APPLICATIONS

This application claims the benefit under 35 U.S.C. § 120 of U.S. patent application Ser. No. 15/899,140 filed on Feb. 19, 2018 and titled Propeller System with Directional Thrust Control, which claims benefit under 35 U.S.C. § 119(e) of U.S. Provisional Patent Application Ser. No. 62/479,355 filed on Mar. 31, 2017 and titled Aircraft Propeller System with Directional Thrust Control, the entire contents of which are incorporated herein by reference.

FIELD OF THE INVENTION

The present invention relates to systems and methods for providing controlled thrust for an aerial vehicle. More specifically, the present invention is directed to a gimbaled fan adapted to rotate and direct thrust in 360 degrees of rotation about two axes.

BACKGROUND

The use of unmanned aerial systems ("UASs") and other aircraft has become important in recent years for a wide variety of applications, including military and commercial uses. In some applications, a UAS or other aircraft may be required to be capable of maneuvering quickly or in tight spaces. Further, the UAS or other aircraft may be required to be highly maneuverable over a wide range of speeds.

Conventional, fixed-wing or rotor, small UASs or other aircraft generally lack the maneuverability and speed range that would be necessary for operating in an tight spaces. Generally, this is due to a reliance upon airflow over control surfaces derived from the forward airspeed of the vehicle or a lack of ability to control the direction of the thrust produced by the rotors. Vertical-takeoff-and-landing ("VTOL") aircraft have been used to address maneuvering challenges at low speeds. For example, in U.S. Pat. No. 6,719,244, a VTOL aircraft uses lateral tilting of the propellers to induce unbalanced torque-induced and gyroscopic moments which act on the aircraft about an axis essentially perpendicular to the tilt axis. Similarly, U.S. Patent Application Publication No. 2006/0192047 discloses a hovering aerial vehicle that uses two ducted fans attached to a common drive housing. In operation, the vanes below each fan body may be tilted differentially or in unison to generate control forces. In certain aspects, fixed wings may be attached to the ducts for forward flight capability.

Despite the foregoing advancements, a need still exists for an aircraft capable of flying at any body orientation over a wide range of speeds.

Accordingly, the subject disclosure provides a durable fan that uses thrust-vectoring modules to enable the aircraft to fly at any body orientation.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a fan for providing thrust. The fan may include at least one blade, a hub, a mount, and a mount motor. The hub may be adapted to carry the at least one blade. The hub motor may be adapted to rotate the hub 360 degrees about a first axis, which extends perpendicular to the at least one blade. The mount may be adapted to carry the hub, and may include a first side securing point and a second side securing point. The mount first and second side securing points may be adapted to pivotally carry the hub. The mount motor may be adapted to rotate the hub 360 degrees about a second axis perpendicular to the first axis and extending through the mount first and second side securing points.

The mount first or second side securing point may be adapted to provide an electrical connection between the hub motor and the mount without encumbering 360 degree rotation of the hub about the second axis.

The fan may include a second mount and a second mount motor. The second mount may be adapted to carry the first mount. The second mount may include second mount first and second side securing points. Each of these securing point may be adapted to pivotally carry the first mount. The second mount motor may be adapted to rotate the first mount 360 degrees about a third axis perpendicular to the second axis and extending through the second mount first and second side securing points.

The second mount first side securing point or second mount second side securing point may be adapted to provide an electrical connection between the hub motor and the second mount without encumbering 360 degree rotation of the hub about the third axis.

The first mount first side securing point may include a first bearing and a second bearing. The first mount may be adapted to carry the first bearing. The first mount may also be adapted to carry the second bearing. The first or second bearing may be in electrical communication with the hub motor. The first or second bearing may be adapted to provide a power pathway between an aircraft and the hub motor.

The second mount first side securing point may include a third bearing and a fourth bearing. The second mount may be adapted to carry the third bearing. The second mount may also be adapted to carry the fourth bearing. The third or fourth bearing may be in electrical communication with the hub motor. The third or fourth bearing may be adapted to provide a power pathway between an aircraft and the hub motor.

The fan may also include a controller adapted to provide one or more control signals the hub motor and first mount motor. The controller may be physically located apart from the at least one the blade, the hub, the hub motor, the first mount, and the first mount motor.

A center of mass may be maintained at a physical center of the first mount.

The first mount and the second mount may have a single physical center and a center of mass may be maintained at the physical center.

The fan may include a duct surrounding and fixedly secured to the hub. The duct may have a first end with a first diameter greater than a second diameter of an opposing second end. The first diameter may taper to the second diameter.

The fan may include a plurality of hub motors adapted to cooperatively rotate the hub 360 degrees about a first axis extending perpendicular to a longitudinal axis of the at least one blade.

Rotation of the at least one blade may create thrust used to propel an aircraft.

The fan may include a first connector adapted to mate with a second connector affixed to an aircraft. The first connector may be adapted to carry both data and power signals.

DETAILED DESCRIPTION OF THE INVENTION

Figure 1:
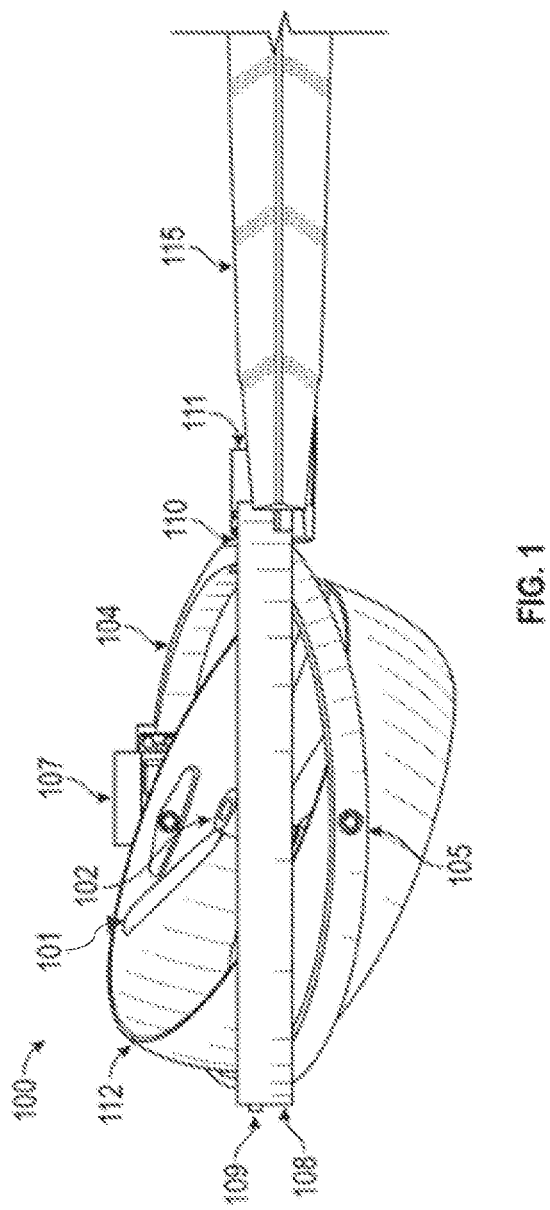
FIG. 1 is a side elevation view of a gimbaled fan in combination with an aircraft according to an embodiment of the present invention.
Figure 2:
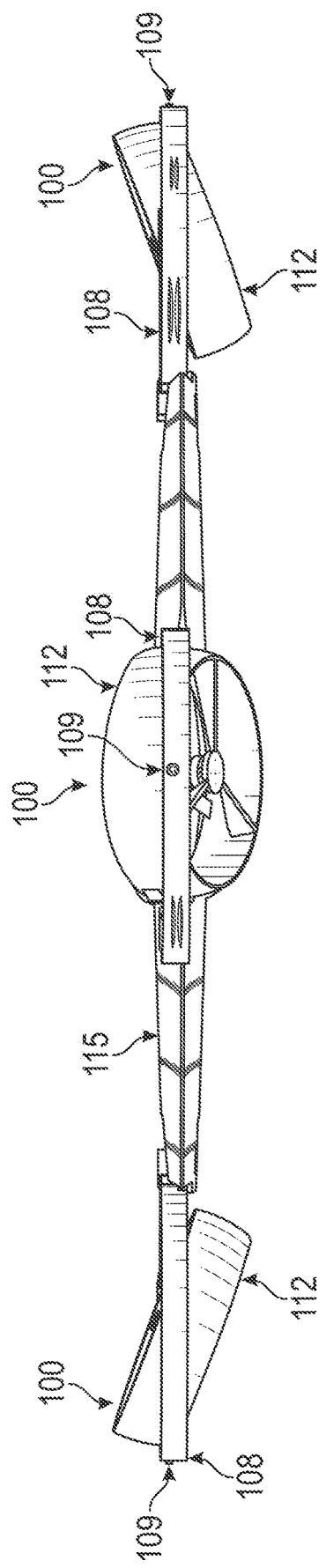
FIG. 2 is a side elevation view of a plurality of gimbaled fans in combination with an aircraft according to an embodiment of the present invention.
Figure 3:
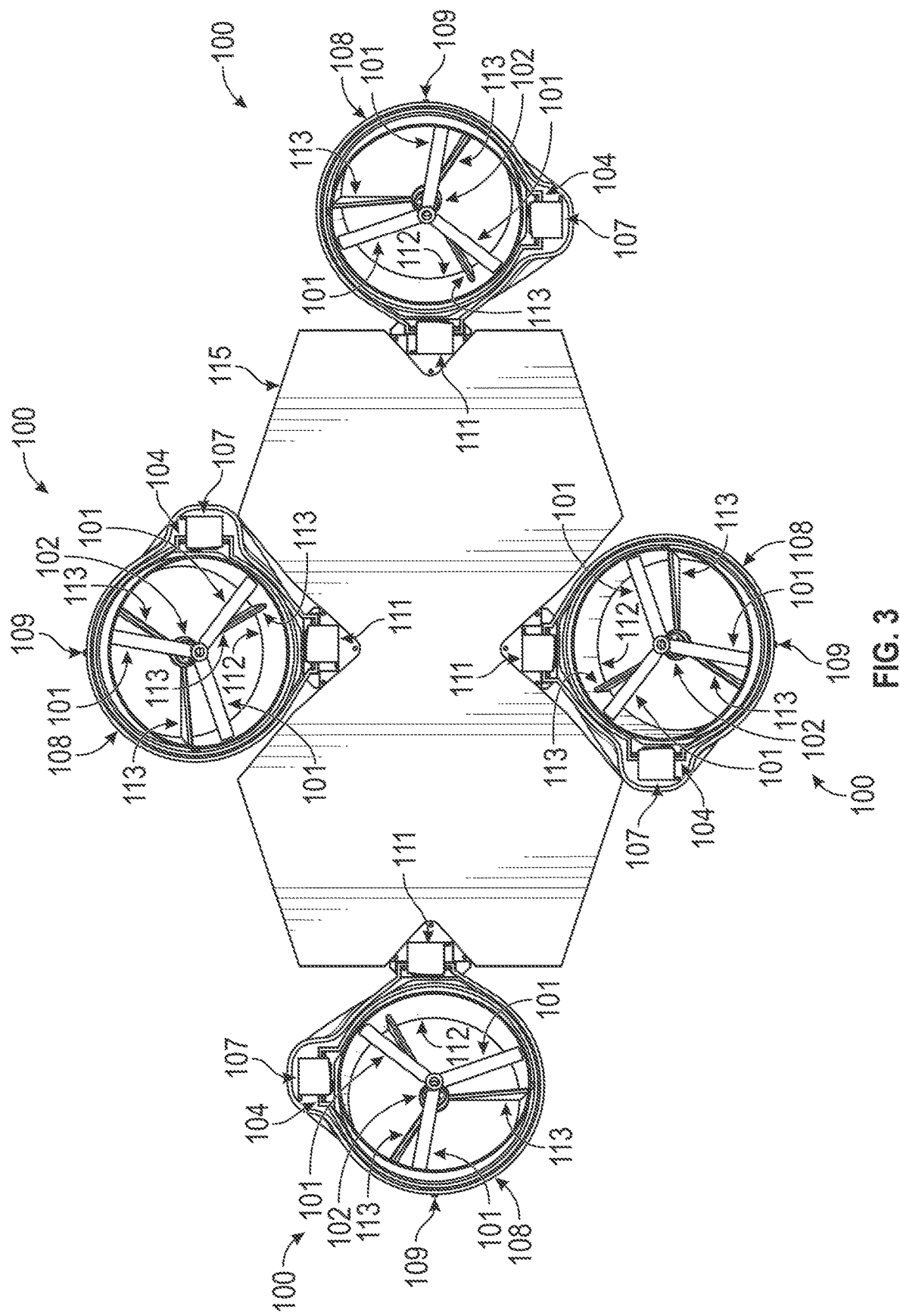
FIG. 3 is a top plan view of a plurality of gimbaled fans in combination with an aircraft according to an embodiment of the present invention.
Figure 4:
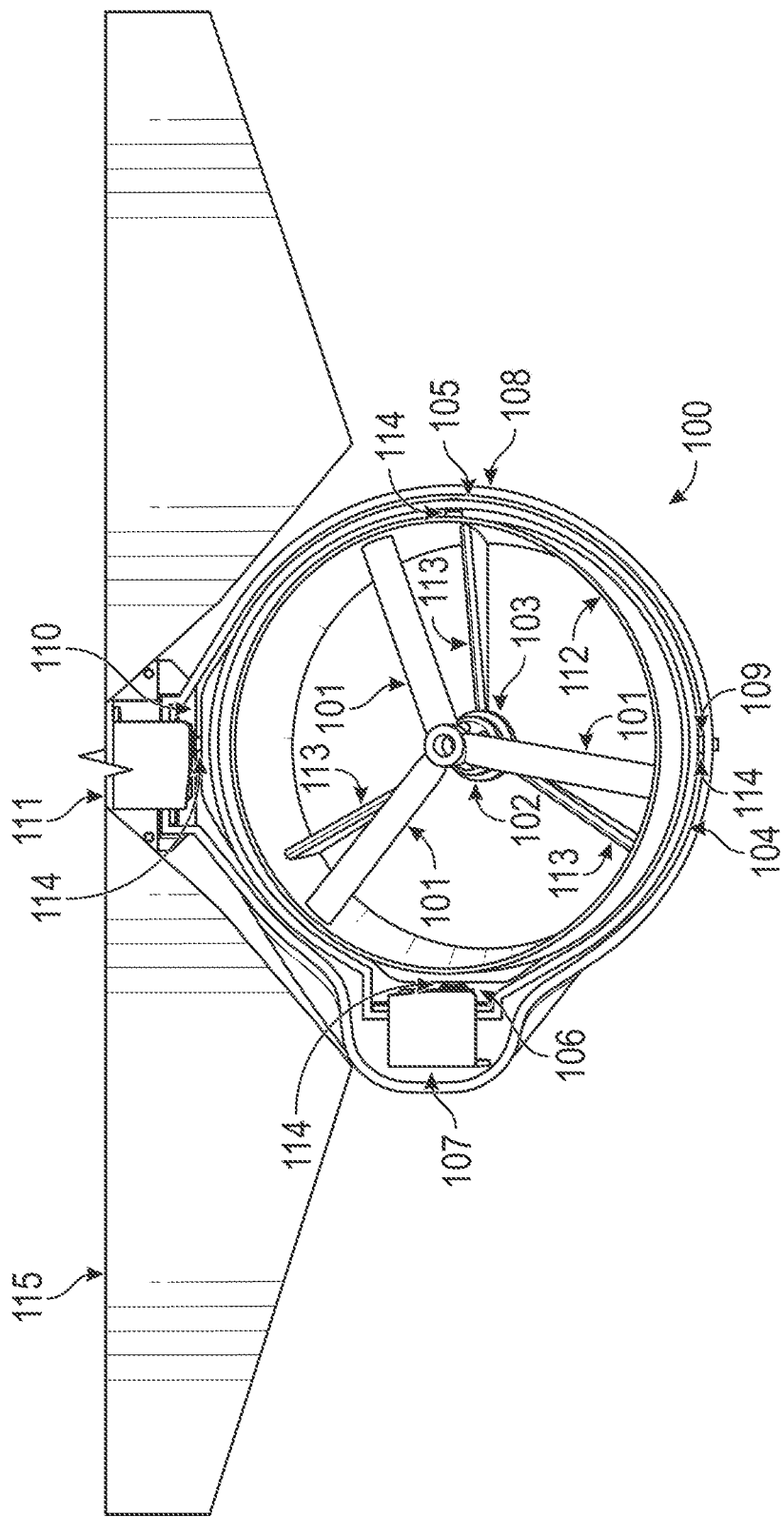
FIG. 4 is a top perspective view of the gimbaled fan of FIG. 1 in combination with an aircraft

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a gimbaled fan 100 having at least one blade 101, a hub 102, a hub motor 103, a first mount 104, and a first mount motor 107. The gimbaled fan 100 may be particularly well suited to providing thrust or control to an unmanned aircraft system (UAS) or other aircraft. The gimbaled fan 100 may be adapted to allow 360 degree rotation in two axes, which allows the thrust to be directed in any direction, providing precise control and improved agility for the UAS or other aircraft.

A hub 102 may be adapted to rotate about an axis of rotation. At least one blade 101 may rotate about the axis of rotation along with the hub 102 and may be angled with respect to the axis of rotation of the hub 102 to create thrust. In one embodiment, there may be one or more blades 101 secured to or carried by a central hub 102. Each blade 101 may be an elongate member with a first end secured to the hub 102 and a second, opposing free end.

A hub motor 103 may be activated to rotate the hub 102. The hub 102 may be adapted to rotate 360° about a first axis. The first axis may extend perpendicularly to a line extending along the longitudinal length of the blade 101. A plurality of hub motors 103 may be adapted to cooperatively rotate the hub 360° about the first axis.

One or more structural members 113 may extend from the hub 102 and fixedly secure to a duct 112. The duct 112 may define a perimeter, which may be circular, and may be centered about the hub 102 at a distance beyond the location of the free end of the plurality of blades 101. The duct 112 may have a length encircling the hub 102 and extending parallel to the hub 102. A first perimeter may be formed along an entirety of a first side of the length. A second perimeter may be formed along an entirety of a second, opposing side of the length. In one embodiment, the first and second perimeters may be circumferences. The diameter of a first perimeter may be greater than a diameter of the second perimeter. And the diameter of the first perimeter may taper to the diameter of the second perimeter along the length of the duct 112. The duct 112 may have an inner side facing the hub 102 and an outer side opposing the inner side. The duct 112 may be adapted to direct or concentrate the thrust generated by the rotating blade(s) 101. This direction of thrust may be accomplished by the tapering along the length of the duct 112.

A first mount 104 may carry the hub 102 and have first and second side securing points 105, 106. The first and second side securing points 105, 106 may oppose each other and may both be adapted to pivotally carry the hub 102. The first mount 104 may define a perimeter, which may be circular. The first mount first side securing point 105 may be located on an inner side of the first mount 104 facing the outer side of the duct 112 and may pivotally secure to the outer side of the duct 112. The first mount second side securing point 106 may be located on an inner side of the first mount 104 opposing the first mount first side securing point 105 and facing the outer side of the duct 112 and may pivotally secure to the outer side of the duct 112. The first mount first and second side securing points 105, 106 may be adapted to allow the hub to rotate about a first axis, which may be along a line joining the first mount first and second side securing points 105, 106 and perpendicular to the axis of rotation of the hub 102.

A first mount motor 107 may be adapted to rotate the first mount 104, and therefore, the hub 102, 360° about the first axis, which may be perpendicular to the axis of rotation of the hub 102.

A second mount 108 may carry the first mount 104 and have first and second side securing points 109, 110. The first and second side securing points 109, 110 may oppose each other and may both be adapted to pivotally carry the first mount 104. The second mount 108 may define a perimeter, which may be circular. The second mount first side securing point 109 may be located on an inner side of the second mount 108 facing the outer side of the first mount 104 and may pivotally secure to the outer side of the first mount 104. The second mount second side securing point 110 may be located on an inner side of the second mount 108 opposing the second mount first side securing point 109 and facing the outer side of the first mount 104 and may pivotally secure to the outer side of the first mount 104. The second mount first and second side securing points 109, 110 may be adapted to avow the hub to rotate about a second axis, which may be along a line joining the second mount first and second side securing points 109, 110 and perpendicular to both the first axis and the axis of rotation of the hub 102.

A second mount motor 111 may be adapted to rotate the second mount 108, and therefore, the hub 102, 360° about the second axis.

The hub motor 103, first mount motor 107, and second mount motor 111 may require an electrical signal to rotate the hub 102, first mount 104, and second mount 108, respectfully. The electrical signal may be provided from an external source, which may be located on an aircraft to which the gimbaled fan 100 is secured. The gimbaled fan 100 may include a first connector electrically connected to the hub motor 103, first mount motor 107 or second mount motor 111 and adapted to mate with a second connector carried by the external source, which may be a UAS or other aircraft. The electrical signal may be passed from the external source to the second mount 108, then to the first mount 104, and finally to the hub 102. A separate electrical signal may be provided to each motor. In one embodiment, a single electrical signal may be provided and it may have control signals for each motor embedded in the power signal.

The electrical signal may be provided to the hub motor 103 through an electrical connection between the pivoting connection of the first mount 104 and the hub 102. In one embodiment, the first or second side securing point 105, 106 may provide an electrical connection to the hub 102. There may be an electrical connection between the first mount first or second side securing point 105, 106 and a corresponding securing point on the outer side of the duct 112. The electrical connection between the hub motor 103 and the first mount 104 may be adapted to provide an electrical connection without encumbering continuous 360° rotation of the hub about the first axis. Specifically, there may be no fixedly secured wire between the hub 102 and the first mount 104. In one embodiment, the electrical connection between the hub 102 and the first mount 104 may include one or more bearings 114. In such an embodiment, a bearing 114 may be carried by both the first mount first side securing point 105 and a corresponding securing point secured to the hub 102, which may be carried by, or secured to, the duct 112. A second bearing 114 may be carried by both the first mount second side securing point 106 and a corresponding securing point secured to the hub 102, which may be carried by, or secured to, the duct 112. The first or second bearing may be in electrical communication with the hub motor 103.

The electrical signal may be provided to the first mount motor 107 through an electrical connection between the pivoting connection of the first mount 104 and the second mount 108. In one embodiment, the second mount first or second side securing points 109, 110 may provide an electrical connection to the first mount 104. There may be an electrical connection between the second mount first or second side securing points 109, 110 and a corresponding securing point on the outer side of the first mount 104. The electrical connection between the first mount motor 107 and the second mount 108 may be adapted to provide an electrical connection without encumbering continuous 360° rotation of the first mount about the second axis. Specifically, there may be no fixedly secured wire between the second mount 108 and the first mount 104. In one embodiment, the electrical connection between the second mount 108 and the first mount 104 may include a bearing 114. In such an embodiment, the bearing 114 may be carried by both the second mount first side securing point 109 and a corresponding securing point secured to the first mount 104. A second bearing 114 may be carried by both the second mount second side securing point 110 and a corresponding securing point secured to the first mount 104. The first or second bearing may be in electrical communication with the first mount motor 107.

The gimbaled fan 100 may also include a controller. The controller may be housed on the connected aircraft physically apart from the at least on blade 101, hub 102, hub motor 103, first mount 104, and first mount motor 107. The controller may be adapted to provide one or more control signals to the hub motor 103, first mount motor 107, or second mount motor 111. The one or more control signals may be provided using the same electrical connections discussed above. The control signal(s) may be separate from the power signal(s) or may be integrated into the power signal(s).

The gimbaled fan 100 may have a center of mass. The center of mass may be located at a physical center of the first mount 104. The gimbaled fan 100 may be adapted to maintain the center of mass at the physical center of the first mount 104 even while the hub 102, first mount 104, and second mount 108 rotate about their respective axes. The first mount 104 and second mount 108 may be configured to co-locate the center of both mounts 104, 108. The center of mass may be maintained at this center of both mounts 104, 108 even as the mounts and the hub rotate.

In one embodiment, the fan 100 may not have a first mount motor 107 or a second mount motor 111. In such an embodiment, the first mount 104 or the second mount 108 may be locked or unlocked. In a locked configuration, the first mount 104 or second mount 108 may be prevented from moving with respect to the attached aircraft 115. In an unlocked configuration, the first mount 104 or second mount 108 may be allowed to move freely with respect to the attached aircraft 115. In embodiments without a mount motor 107, 111, the fan 100 may self-gimbal by controlling the pitch of one or more blades 101 as disclosed and described in related U.S. patent application Ser. No. 15/899,140 filed on Feb. 19, 2018 titled Propeller System with Directional Thrust Control.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A fan for providing thrust comprising:
at least one blade;
a hub adapted to carry the at least one blade, said hub disposed along a first axis, and said at least one blade having a first end secured to the hub, said at least one blade being an elongate member extending away from said first axis and having a second, opposing free end;
at least one hub motor adapted to rotate the hub 360 degrees about said first axis extending perpendicular to the at least one blade;
at least one structural member extending from the hub and fixedly attached to a duct, said duct defining a perimeter centered about said hub, said perimeter located at a distance beyond the location of the free end of said at least one blade;
a first mount adapted to carry the hub by attaching to said duct at a first mount first side securing point adapted to pivotally carry the hub and a first mount second side securing point adapted to pivotally carry the hub; and
a first mount motor adapted to rotate the hub 360 degrees about a second axis perpendicular to the first axis and extending through the first mount first and second side securing points.

2. The fan according to claim 1 wherein the first mount first side securing point or first mount second side securing point is adapted to provide an electrical connection between the at least one hub motor and the first mount without encumbering 360 degree rotation of the hub about the second axis.

3. The fan according to claim 1 further comprising:
a second mount adapted to carry the first mount, wherein the second mount further comprises:
a second mount first side securing point adapted to pivotally carry the first mount, and a second mount second side securing point adapted to pivotally carry the first mount; and
a second mount motor adapted to rotate the first mount 360 degrees about a third axis perpendicular to the second axis and extending through the second mount first and second side securing points.

4. The fan according to claim 3 wherein the second mount first side securing point or second mount second side securing point is adapted to provide an electrical connection between the at least one hub motor and the second mount without encumbering 360 degree rotation of the hub about the third axis.

5. The fan according to claim 3 wherein the first mount and the second mount have a single physical center and a center of mass is maintained at the physical center.

6. The fan according to claim 1 wherein the first mount first side securing point comprises a first bearing;
wherein the first mount second side securing point comprises a second bearing;
wherein the first mount is adapted to carry the first bearing; and
wherein the first mount is adapted to carry the second bearing.

7. The fan according to claim 6 wherein the first or second bearing is in electrical communication with the at least one hub motor.

8. The fan according to claim 6 wherein the second mount first side securing point comprises a third bearing:
wherein the second mount second side securing point comprises a fourth bearing;
wherein the second mount is adapted to carry the third bearing; and
wherein the second mount is adapted to carry the fourth bearing.

9. The fan according to claim 8 wherein the third or fourth bearing is in electrical communication with the at least one hub motor.

10. The fan according to claim 9 wherein the third or fourth bearing is adapted to provide a power pathway between an aircraft and the at least one hub motor.

11. The fan according to claim 1 further comprising:
at least one blade attachment apparatus attached to the hub, each blade of the at least one blade being attached to a blade attachment apparatus of said at least one blade attachment apparatus; and
wherein each blade attachment apparatus of said at least one blade attachment apparatus is operable to rotate the at least one blade attached thereto about a blade rotation axis.

12. The fan according to claim 1 further comprising:
a controller adapted to provide one or more control signals the at least one hub motor and first mount motor; and
wherein the controller is physically located apart from the at least one the blade, the hub, at least one the hub motor, the first mount, and the first mount motor.

13. The fan according to claim 1 wherein a center of mass is maintained at a physical center of the first mount.

14. The fan according to claim 1 further comprising: a duct surrounding and fixedly secured to the hub.

15. The fan according to claim 14 wherein the duct has a first end with a first diameter greater than a second diameter of an opposing second end and the first diameter tapers to the second diameter.

16. The fan according to claim 1 wherein said at least one hub motor is further defined as a plurality of hub motors.

17. The fan according to claim 1 wherein rotation of the at least one blade creates thrust used to propel an aircraft.

18. The fan according to claim 1 further comprising:
a first connector adapted to mate with a second connector affixed to an aircraft; and
wherein the first connector is adapted to carry both data and power signals.

19. A fan for providing thrust comprising:
at least one blade;
a hub adapted to carry the at least one blade, said hub disposed along a first axis, and said at least one blade having a first end secured to the hub, said at least one blade being an elongate member extending away from said first axis and having a second, opposing free end;

a hub motor adapted to rotate the hub 360 degrees about said first axis extending perpendicular to the at least one blade;

at least one structural member extending from the hub and fixedly attached to a duct, said duct defining a perimeter centered about said hub, said perimeter located at a distance beyond the location of the free end of said at least one blade;

a first mount adapted to carry the hub by attaching to said duct at a first mount first side securing point adapted to pivotally carry the hub and a first mount second side securing point adapted to pivotally carry the hub; and, a first mount motor adapted to rotate the hub 360 degrees about a second axis perpendicular to the first axis and extending through the first mount first and second side securing points;

a second mount adapted to carry the first mount, wherein the second mount further comprises:

a second mount first side securing point adapted to pivotally carry the first mount, and a second mount second side securing point adapted to pivotally carry the first mount; and a second mount motor adapted to rotate the first mount 360 degrees about a third axis perpendicular to the second axis and extending through the second mount first and second side securing points;

wherein the first mount first side securing point comprises a first bearing;

wherein the first mount second side securing point comprises a second bearing;

wherein the first mount is adapted to carry the first bearing;

wherein the first mount is adapted to carry the second bearing;

wherein the first or second bearing is in electrical communication with the hub motor;

wherein the second mount first side securing point comprises a third bearing;

wherein the second mount second side securing point comprises a fourth bearing;

wherein the second mount is adapted to carry the third bearing;

wherein the second mount is adapted to carry the fourth bearing; and wherein the third or fourth bearing is in electrical communication with the hub motor.

* * * * *